United States Patent
Hiraga et al.

(10) Patent No.: US 10,276,146 B2
(45) Date of Patent: Apr. 30, 2019

(54) ACTIVE NOISE CONTROL DEVICE

(71) Applicant: Panasonic Intellectual Property Management Co., Ltd., Osaka (JP)

(72) Inventors: Yusuke Hiraga, Kanagawa (JP); Mitsuhiro Tani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/507,917

(22) PCT Filed: Jun. 30, 2016

(86) PCT No.: PCT/JP2016/003139
§ 371 (c)(1),
(2) Date: Mar. 1, 2017

(87) PCT Pub. No.: WO2017/006547
PCT Pub. Date: Jan. 12, 2017

(65) Prior Publication Data
US 2017/0294180 A1    Oct. 12, 2017

(30) Foreign Application Priority Data

Jul. 9, 2015  (JP) .................................. 2015-137462

(51) Int. Cl.
*G10K 11/178*    (2006.01)
*B60R 11/02*    (2006.01)

(52) U.S. Cl.
CPC ............ *G10K 11/178* (2013.01); *B60R 11/02* (2013.01); *G10K 11/17854* (2018.01);
(Continued)

(58) Field of Classification Search
CPC .. G10K 11/16; G10K 11/178; G10K 11/1782; G10K 2210/128;
(Continued)

(56) References Cited

U.S. PATENT DOCUMENTS 7,873,173 B2 *  1/2011  Inoue ................. G10K 11/1784
331/10
2004/0240678 A1 * 12/2004  Nakamura ......... G10K 11/1784
381/71.11

(Continued)

FOREIGN PATENT DOCUMENTS

| JP | 2000-099037 | | 4/2000 |
|---|---|---|---|
| JP | 2007-269050 | A | 10/2007 |
| JP | 4079831 | B | 4/2008 |

OTHER PUBLICATIONS

International Search Report of PCT application No. PCT/JP2016/003139 dated Sep. 13, 2016.
(Continued)

*Primary Examiner* — Jason R Kurr
(74) *Attorney, Agent, or Firm* — Greenblum & Bernstein, P.L.C.

(57) ABSTRACT

According to an aspect, an active noise control device includes: a control frequency determinator that determines a frequency of the noise; a reference cosine-wave generator that generates a reference cosine-wave signal having the determined frequency; a reference sine-wave generator that generates a reference sine-wave signal having the frequency of a noise; a first one-tap adaptive filter to which the reference cosine-wave signal is input, the first one-tap adaptive filter having a first filter coefficient; a second one-tap adaptive filter to which the reference sine-wave signal is input, the second one-tap adaptive filter having a second filter coefficient; an adder that adds an output signal from the first one-tap adaptive filter and an output signal from the second one-tap adaptive filter to each other; a (Continued)

secondary noise generator that is driven by an output signal from the adder to generate a secondary noise; a residual sound detector that detects a residual sound generated by interference between the secondary noise and the noise; a simulation signal generator that outputs a simulation cosine-wave signal and a simulation sine-wave signal, the simulation cosine-wave signal and the simulation sine-wave signal being obtained by correcting the reference cosine-wave signal and the reference sine-wave signal using a characteristic in which a transfer characteristic from the secondary noise generator to the residual sound detector is simulated; and a filter coefficient updating unit that updates the first filter coefficient and the second filter coefficient based on an output signal from the residual sound detector, an output signal from the simulation signal generator, the reference cosine-wave signal, the reference sine-wave signal, and the output signal from the adder. The secondary noise is reduced in a space where the residual sound detector is installed.

8 Claims, 9 Drawing Sheets

(52) U.S. Cl.
CPC ............... *G10K 11/17883* (2018.01); *G10K 2210/1282* (2013.01); *G10K 2210/3028* (2013.01); *G10K 2210/3056* (2013.01)

(58) Field of Classification Search
CPC ... G10K 2210/1282; G10K 2210/3028; G10K 2210/3055; G10K 2210/3056; B60R 11/02
USPC ...................................................... 381/71.14
See application file for complete search history.

(56) References Cited

U.S. PATENT DOCUMENTS

| | | | |
|---|---|---|---|
| 2007/0172004 A1 | 7/2007 | Funayama et al. | |
| 2008/0292110 A1 | 11/2008 | Kobayashi et al. | |
| 2011/0026723 A1* | 2/2011 | Inoue | G10K 11/178 381/71.4 |
| 2012/0033821 A1* | 2/2012 | Ohta | G10K 11/1782 381/71.1 |
| 2015/0269924 A1* | 9/2015 | Yano | G10K 11/178 381/71.1 |

OTHER PUBLICATIONS

The Extended European Search Report dated Jun. 26, 2018 for European Patent Application No. 168210235.

\* cited by examiner

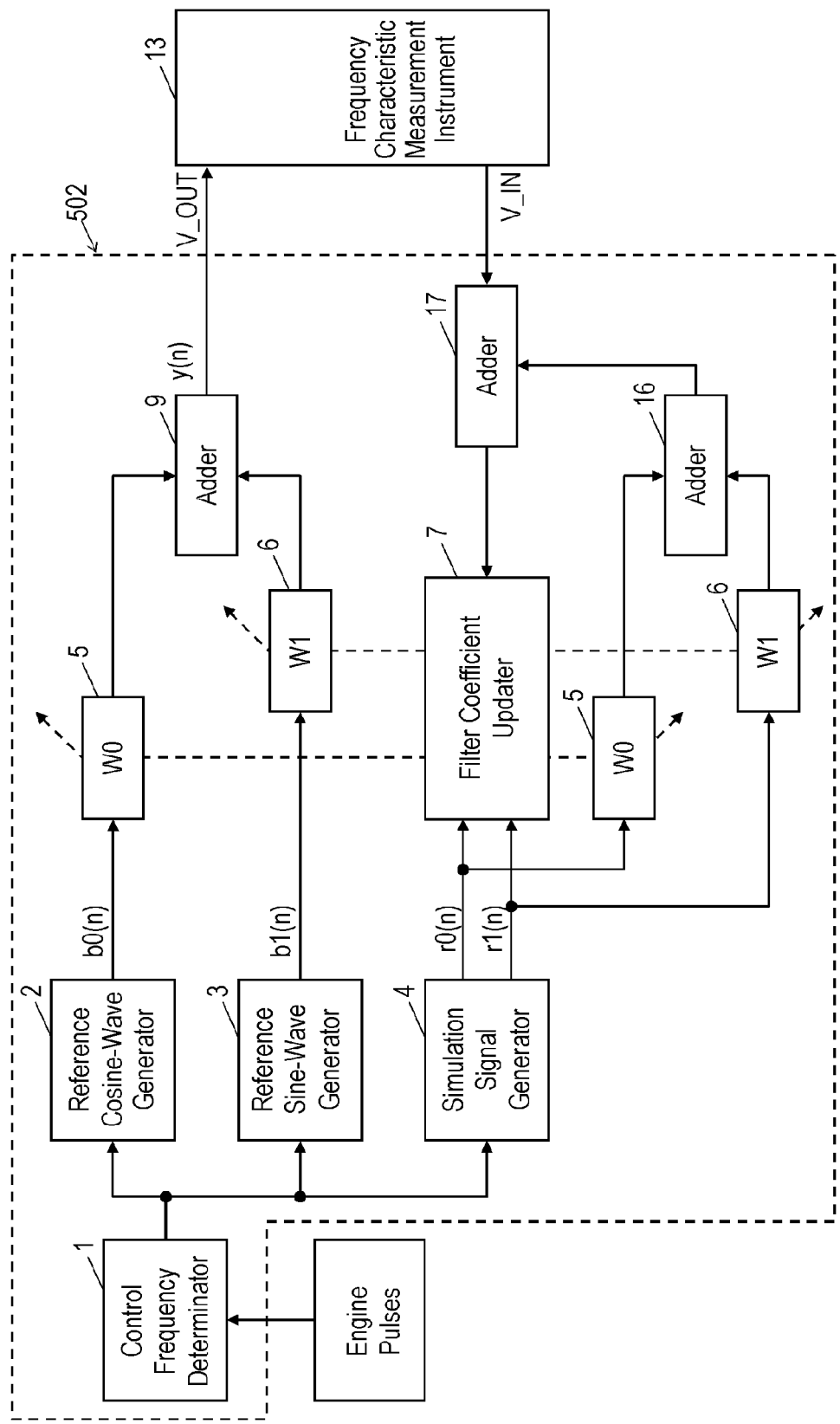

ACTIVE NOISE CONTROL DEVICE

This application is a U.S. national stage application of the PCT international application No. PCT/JP2016/003139 filed on Jun. 30, 2016, which claims the benefit of foreign priority of Japanese patent application No. 2015-137462 filed on Jul. 9, 2015, the contents all of which are incorporated herein by reference.

TECHNICAL FIELD

The present invention relates to an active noise control device that reduces a noise generated due to a vibration of, e.g. an engine in a vehicle compartment.

BACKGROUND ART

FIG. 9 is a block diagram of conventional active noise control device 501. Active noise control device 501 reduces a noise generated due to a rotation of a vehicle engine in a vehicle compartment by generating an acoustic wave having the same amplitude as the noise and a phase opposite to the noise, and causing the acoustic wave to interfere with the noise.

A control signal for generating the acoustic wave interfering with the noise is generated by multiplying a sine-wave signal and a cosine-wave signal which have the same frequency as the noise by adaptive filter coefficients, and summing the sine-wave signal and the cosine-wave signal.

An adaptive filter is updated by an LMS algorithm based on a reference signal of a sine-wave signal and a simulation signal which is generated by convoluting a transfer characteristic between a loudspeaker and a microphone with a signal from the microphone located at a control point.

PTL 1 and PTL 2 are prior art information relating to active noise control device 501.

CITATION LIST

Patent Literature

PTL 1: Japanese Patent Laid-Open Publication No. 2000-99037
PTL 2: Japanese Patent No. 4079831

SUMMARY

An active noise control device includes a control frequency determinator that determines a frequency of a noise, a reference cosine-wave generator that generates a reference cosine-wave signal having the determined frequency, a reference sine-wave generator that generates a reference sine-wave signal having the determined frequency, a first one-tap adaptive filter that receives the reference cosine-wave signal, the first one-tap adaptive filter having a first filter coefficient, a second one-tap adaptive filter that receives the reference sine-wave signal, the second one-tap adaptive filter having a second filter coefficient, an adder that adds an output signal from the first one-tap adaptive filter to an output signal from the second one-tap adaptive filter, a secondary noise generator that is driven by an output signal from the adder as to generate a secondary noise, a residual sound detector that detects a residual sound generated by interference between the secondary noise and the noise, a simulation signal generator that outputs a simulation cosine-wave signal and a simulation sine-wave signal obtained by correcting the reference cosine-wave signal and the reference sine-wave signal with a characteristic simulating a transfer characteristic from the secondary noise generator to the residual sound detector, and a filter coefficient updating unit that updates the first filter coefficient and the second filter coefficient based on an output signal from the residual sound detector, an output signal from the simulation signal generator, the reference cosine-wave signal, the reference sine-wave signal, and an output signal from the adder. The secondary noise is reduced in a space where the residual sound detector is located.

BRIEF DESCRIPTION OF DRAWINGS

FIG. 4 is a block diagram of an open-loop frequency response measuring system of a conventional active noise control device.

DETAIL DESCRIPTION OF PREFERRED EMBODIMENTS

In conventional active noise control device 501, a current transfer characteristic between a loudspeaker and a microphone may be different from transfer characteristic data stored in a memory of the active noise control device in order to generate the simulation signal due to a characteristic change in response to the loudspeaker or microphone or an environmental change in a vehicle compartment due to opening or closing of a window and an increase or decrease of occupants. In this case, the adaptive filter may operate unstably to fall into a divergent state in which not an ideal noise reduction effect is obtained but the noise increases.

In conventional active noise control device 501, even on condition that an external noise is mixed due to traveling on a rough road or the opening of the window, a filter coefficient is not properly updated and the operation of the adaptive filter becomes unstable. In the worst case, an abnormal sound may be generated by the divergence to provide the occupant with uncomfortable feeling. When a noise level at a position of the microphone installed at a control point is different from a noise level at a position of an ear of the occupant, conventional active noise control device 501 may be in an overcompensation state in which the noise reduction effect decreases at the position of the ear of the occupant.

In order to solve the problem, PTL 2 discloses that a signal (compensation signal) is generated in a numerical operation such that the control signal is acoustically transmitted to the microphone with the initial transfer characteristic, and a signal in which the compensation signal and an output signal from the microphone are added to each other is used in an adaptive control algorithm Therefore, when the current transfer characteristic changes considerably from the initial transfer characteristic, or when the filter coefficient of an adaptive notch filter varies largely due to mixture of an external noise, the adaptive control algorithm improves the stability of the adaptive notch filter, and the overcompensation is suppressed at the position of the ear of the occupant while the divergence of the filter is suppressed.

However, in this case, it is necessary to perform a compensation signal generating computation in each microphone. In a system mounted to an actual vehicle, it is necessary to install plural microphones. For this reason, in the method disclosed in PTL 2, a computation amount increases as the increase of the number of the microphones to become a disadvantage in terms of cost in the actually used case.

Exemplary Embodiment 1

Figure 1:
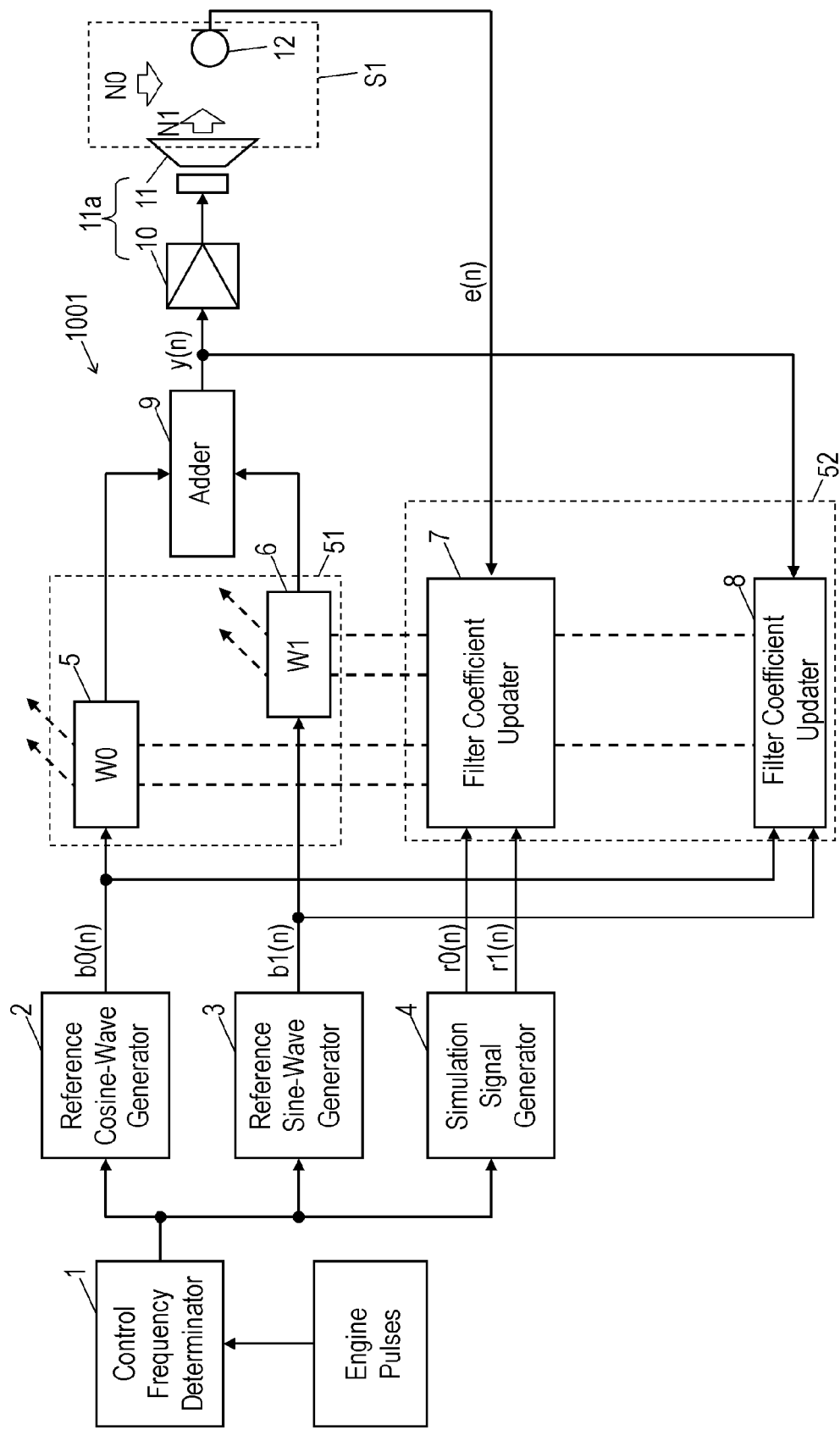
FIG. 1 is a block diagram of an active noise control device according to Exemplary Embodiment 1.

FIG. 1 is a block diagram of active noise control device 1001 according to Exemplary Embodiment 1. Active noise control device 1001 includes control frequency determinator 1, reference cosine-wave generator 2, reference sine-wave generator 3, one-tap adaptive filters 5 and 6, adder 9, secondary noise generator 11a, simulation signal generator 4, filter coefficient updaters 7 and 8, and residual sound detector 12. Control frequency determinator 1 receives a signal relating to a rotating component, such as an engine and a shaft in an automobile, and outputs, according to a detected rotational frequency, frequency f of noise N0 in control space S1 to be silenced. For example, control frequency determinator 1 receives an engine pulse that is an electric signal synchronized with the engine rotation, and detects the engine rotation speed. Control frequency determinator 1 outputs frequency f of noise N0 which is generated according to the rotation speed. Frequency f output from control frequency determinator 1 is input to reference cosine-wave generator 2, reference sine-wave generator 3, and simulation signal generator 4. One-tap adaptive filters 5 and 6 constitute adaptive notch filter 51. Filter coefficient updaters 7 and 8 constitute filter coefficient updating unit 52.

Reference cosine-wave generator 2 and reference sine-wave generator 3 generate reference cosine-wave signal $b0(n)$ and reference sine-wave signal $b1(n)$, respectively. Reference cosine-wave signal $b0(n)$ and reference sine-wave signal $b1(n)$ are synchronized with frequency f to be controlled and obtained at time n by control frequency determinator 1. The phases of cosine-wave signal $b0(n)$ and reference sine-wave signal $b1(n)$ shift from each other by 90 degrees.

Reference cosine-wave signal $b0(n)$ that is an output signal of reference cosine-wave generator 2 is multiplied by filter coefficient $W0(n)$ of one-tap adaptive filter 5 of adaptive notch filter 51. Similarly, reference sine-wave signal $b1(n)$ that is an output signal of reference sine-wave generator 3 is multiplied by filter coefficient $W1(n)$ of one-tap adaptive filter 6 of adaptive notch filter 51. Adder 9 outputs output signal y(n) obtained by adding output signal ($W0(n) \cdot b0(n)$) of one-tap adaptive filter 5 to output signal ($W1(n) \cdot b1(n)$) of one-tap adaptive filter 6.

Secondary noise generator 11a includes power amplifier 10 and loudspeaker 11. Residual sound detector 12 and loudspeaker 11 of secondary noise generator 11a are located in control space S1. Output signal y(n) of adder 9 output from adaptive notch filter 51 is amplified by power amplifier 10, and emitted from loudspeaker 11 as secondary noise N1 canceling noise N0 to be controlled. Noise N0 to be controlled is cancelled due to the interference with secondary noise N1. Residual sound that is not cancelled on this occasion is detected by residual sound detector 12 that is a microphone, and used as error signal e(n) in a first adaptive control algorithm that updates filter coefficients $W0(n)$ and $W1(n)$ of one-tap adaptive filters 5 and 6.

Simulation signal generator 4 stores data of a transfer characteristic from power amplifier 10 to residual sound detector 12 at frequency f, and generates a simulation signal obtained by convoluting the transfer characteristic with the reference signal. The simulation signal includes simulation cosine-wave signal $r0(n)$ and simulation sine-wave signal $r1(n)$. The simulation cosine-wave signal $r0(n)$ is obtained by convoluting the transfer characteristic with reference cosine-wave signal $b0(n)$, and the simulation sine-wave signal $r1(n)$ is obtained by convoluting the transfer characteristic with reference sine-wave signal $b1(n)$. That is, simulation signal generator 4 outputs simulation cosine-wave signal $r0(n)$ and simulation sine-wave signal $r1(n)$ obtained by correcting reference cosine-wave signal $b0(n)$ and reference sine-wave signal $b1(n)$ using a characteristic simulating the transfer characteristic from secondary noise generator 11a (loudspeaker 11) to residual sound detector 12.

The transfer characteristic data stored in a recording medium, such as a ROM, is used to generate simulation signals $r0(n)$ and $r1(n)$. An amplitude characteristic and a phase characteristic of a transmission system are previously measured by a frequency response analyzer, and the amplitude and phase at each of various frequencies are stored in the recording medium as a table. The amplitude and the phase are read from the table stored in the recording medium based on an output of control frequency determinator, and the signal is generated by calculating a cosine-wave and a sine-wave which have the read amplitude and phase and the frequency based on the output of control frequency determinator 1.

That is, simulation cosine-wave signal $r0(n)$ and simulation sine-wave signal $r1(n)$ at time n are obtained based on gain C, phase $\phi$, and frequency f output from control frequency determinator 1 by formula (1) and formula (2).

$$r0(n) = C \cdot \cos(2 \cdot \pi \cdot f \cdot n + \phi) \quad (1)$$

$$r1(n) = C \cdot \sin(2 \cdot \pi \cdot f \cdot n + \phi) \quad (2)$$

Filter coefficient updater 7 executes the first adaptive control algorithm with simulation signals $r0(n)$ and $r1(n)$ and error signal e(n) output from residual sound detector 12.

Filter coefficients $W0(n)$ and $W1(n)$ of one-tap adaptive filters 5 and 6 are updated with formula (3) and formula (4) based on step size parameter $\mu$, respectively.

$$W0(n+1) = W0(n) - \mu \cdot r0(n) \cdot e(n) \quad (3)$$

$$W1(n+1) = W1(n) - \mu \cdot r1(n) \cdot e(n) \quad (4)$$

The control is further stabilized by a second adaptive control algorithm Filter coefficient updater 8 executes the second adaptive control algorithm with reference signal $b0(n)$ and $b1(n)$ and output signal $y(n)$ of adaptive notch filter 51.

In the second adaptive control algorithm, filter coefficients $W0(n)$ and $W1(n)$ of one-tap adaptive filters 5 and 6 are updated by formula (5) and formula (6) based on step size parameter $\mu$, respectively.

$$W0(n+1)=W0(n)-\mu \cdot b0(n) \cdot y(n) \quad (5)$$

$$W1(n+1)=W1(n)-\mu \cdot b1(n) \cdot y(n) \quad (6)$$

Active noise control device 1001 combines the first adaptive control algorithm with the second adaptive control algorithm to update filter coefficients $W0(n)$ and $W1(n)$ by formula (7) and formula (8), respectively.

$$W0(n+1)=W0(n)-\mu \cdot (r0(n) \cdot e(n)+b0(n) \cdot y(n)) \quad (7)$$

$$W1(n+1)=W1(n)-\mu \cdot (r1(n) \cdot e(n)+b1(n) \cdot y(n)) \quad (8)$$

As described above, filter coefficient updating unit 52 updates filter coefficients $W0(n)$ and $W1(n)$ based on the output signal (error signal $e(n)$) from residual sound detector 12, the output signal (simulation cosine-wave signal $r0(n)$, simulation sine-wave signal $r1(n)$) from simulation signal generator 4, reference cosine-wave signal $b0(n)$, reference sine-wave signal $b1(n)$, and output signal $y(n)$ from adder 9.

Filter coefficient updater 7 updates filter coefficients $W0(n)$ and $W1(n)$ based on output signal (error signal $e(n)$) from residual sound detector 12 and the output signal (simulation cosine-wave signal $r0(n)$ and simulation sine-wave signal $r1(n)$) from simulation signal generator 4 with use of none of reference cosine-wave signal $b0(n)$, reference sine-wave signal $b1(n)$, and output signal $y(n)$ from adder 9. Filter coefficient updater 8 updates filter coefficients $W0(n)$ and $W1(n)$ based on reference cosine-wave signal $b0(n)$, reference sine-wave signal $b1(n)$, and output signal $y(n)$ from adder 9 with use of none of the output signal (error signal $e(n)$) from residual sound detector 12 and the output signal (simulation cosine-wave signal $r0(n)$ and simulation sine-wave signal $r1(n)$) from simulation signal generator 4.

Figure 2:
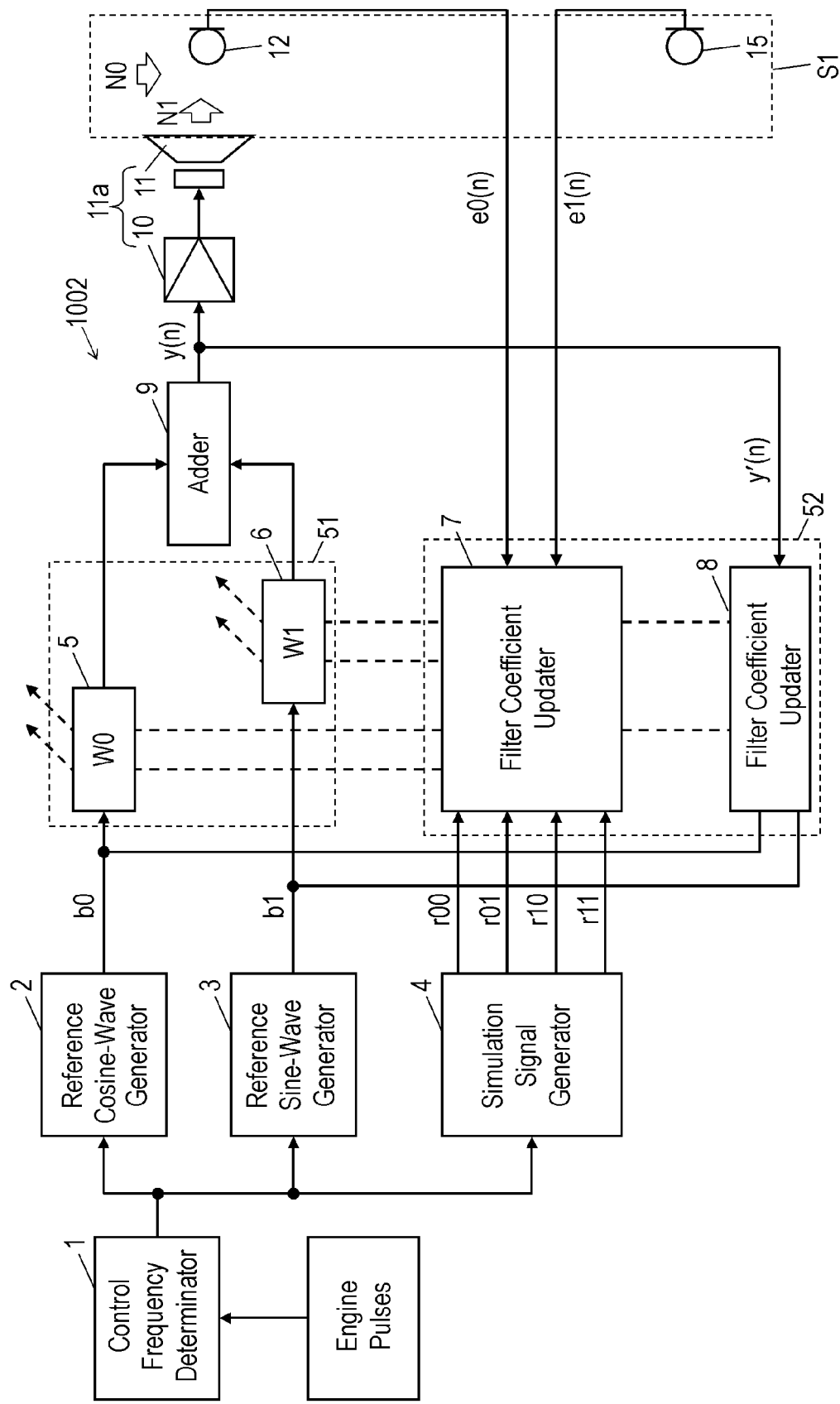
FIG. 2 is a block diagram of another active noise control device according to Embodiment 1.

The case that the number of microphones, namely, residual sound detectors 12 increasing from one to two will be described below. FIG. 2 is a block diagram of another active noise control device 1002 according to Embodiment 1. In FIG. 2, components identical to those of active noise control device 1001 shown in FIG. 1 are denoted by the same reference numerals. Active noise control device 1002 further includes residual sound detector 15 implemented by a microphone.

Noise N0 to be controlled is cancelled due to the interference with secondary noise N1. Residual sound detectors 12 and 15 located in the control space detect the residual sound that is not cancelled at this point, and output error signals $e0(n)$ and $e1(n)$ based on the detected residual sound.

Simulation signal generator 4 outputs simulation cosine-wave signal $r00(n)$ and simulation sine-wave signal $r01(n)$. Output simulation cosine-wave signal $r00(n)$ and simulation sine-wave signal $r01(n)$ are obtained by correcting reference cosine-wave signal $b0(n)$ and reference sine-wave signal $b1(n)$ using a characteristic simulating the transfer characteristic from secondary noise generator 11a (loudspeaker 11) to residual sound detector 12. Similarly, simulation signal generator 4 outputs simulation cosine-wave signal $r10(n)$ and simulation sine-wave signal $r11(n)$. Outputs simulation cosine-wave signal $r10(n)$ and simulation sine-wave signal $r11(n)$ are obtained by correcting reference cosine-wave signal $b0(n)$ and reference sine-wave signal $b1(n)$ using a characteristic simulating the transfer characteristic from secondary noise generator 11a (loudspeaker 11) to residual sound detector 15.

In active noise control device 1002 shown in FIG. 2, filter coefficients $W0(n)$ and $W1(n)$ of one-tap adaptive filters 5 and 6 are updated by formula (9) and formula (10) based on step size parameter $\mu$, respectively.

$$W0(n+1)=W0(n)-\mu \cdot (r00(n) \cdot e0(n)+r01(n) \cdot e1(n)+b0(n) \cdot y(n)) \quad (9)$$

$$W1(n+1)=W1(n)-\mu \cdot (r10(n) \cdot e0(n)+r11(n) \cdot e1(n)+b1(n) \cdot y(n)) \quad (10)$$

Figure 9:
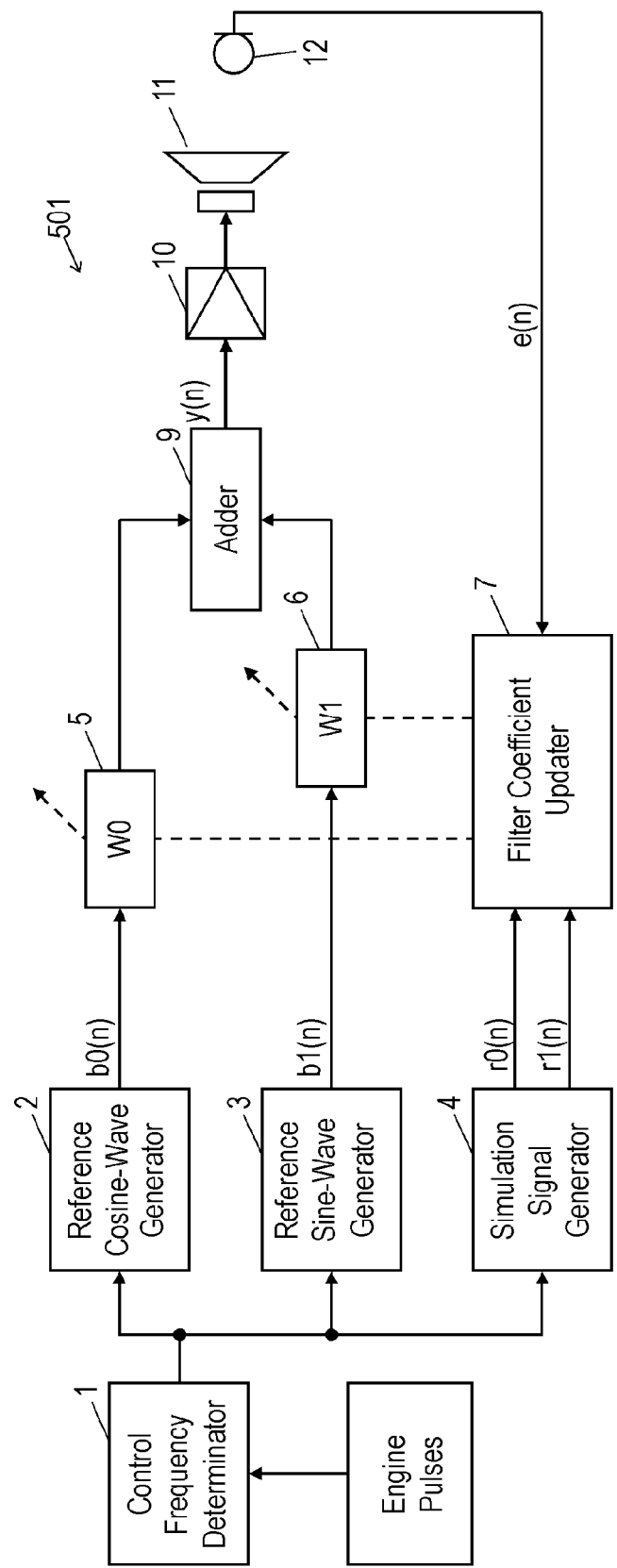
FIG. 9 is a block diagram of a conventional active noise control device.

In formula (9) and formula (10), the first term and the second term in the parenthesis by which step size parameter p, is multiplied correspond to the first adaptive control algorithm of filter coefficient updater 7. The third term in the parenthesis corresponds to the second adaptive control algorithm of filter coefficient updater 8. As shown in a comparison between formula (7) and formula (9) and a comparison between formula (8) and formula (10), the amount of the second adaptive control algorithm does not increase even if the number of microphones, the residual sound detectors increases. Accordingly, even when the number of microphones increases, the similar effect can be obtained with a smaller amount of operation than conventional active noise control device 501 shown in FIG. 9.

As described above, in active noise control device 1002, filter coefficient updating unit 52 updates filter coefficients $W0(n)$ and $W1(n)$ based on the output signals (error signals $e0(n)$ and $e1(n)$) from residual sound detectors 12 and 15, the output signal (simulation cosine-wave signals $r00(n)$ and $r10(n)$ and simulation sine-wave signals $r10(n)$ and $r11(n)$) from simulation signal generator 4, reference cosine-wave signal $b0(n)$, reference sine-wave signals $b1(n)$, and output signal $y(n)$ from adder 9.

In active noise control device 1002, filter coefficient updater 7 updates filter coefficients $W0(n)$ and $W1(n)$ based on the output signals (error signals $e0(n)$ and $e1(n)$) from residual sound detectors 12 and 15 and the output signal (simulation cosine-wave signals $r00(n)$ and $r10(n)$ and simulation sine-wave signals $r01(n)$ and $r11(n)$) from simulation signal generator 4 with use of none of reference cosine-wave signal $b0(n)$, reference sine-wave signal $b1(n)$, and output signal $y(n)$ from adder 9. Filter coefficient updater 8 updates filter coefficients $W0(n)$ and $W1(n)$ based on reference cosine-wave signal $b0(n)$, reference sine-wave signals $b1(n)$, and output signal $y(n)$ from adder 9 instead of the output signal (error signals $e0(n)$ and $e1(n)$) from residual sound detectors 12 and 15 and the output signal (simulation cosine-wave signals $r00(n)$ and $r10(n)$ and simulation sine-wave signals $r01(n)$ and $r11(n)$) from simulation signal generator.

The derivation of the formulas for updating will be described below.

A least mean square (LMS) method algorithm is successively finds a solution minimizing evaluation function J represented by formula (11).

$$J=E[e(n)^2] \quad (11)$$

E[P] represents an expectation value of variable P. The adaptive control algorithm is based on a steepest descent method.

In the steepest descent method, filter coefficient $w(n)$ of a k-tap adaptive filter is updated by formula (12) based on step size parameter $\mu$.

$$w(n+1)=w(n)-\mu \cdot E[x(n) \cdot e(n)] \quad (12)$$

Filter coefficient w(n) is a k-dimensional vector. Reference signal x(n) is also a k-dimensional vector. Step size parameter μ is a scalar value. The second term of formula (12) is called as a gradient vector that approaches a zero vector as the adaptive filter converges.

Additionally, in the LMS algorithm, formula (13) updating filter coefficient w(n) is derived by replacing expectation value calculation of the second term for an instantaneous value calculation.

$$w(n+1)=w(n)-\mu \cdot x(n) \cdot e(n) \tag{13}$$

That is, an update vector is calculated by a cross-correlation between reference signal x(n) and error signal e(n) in the steepest descent method. The update vector is calculated by the instantaneous value of the cross-correlation in the LMS algorithm.

PTL 2 discloses formula (15) and formula (16) which update filter coefficients $W0(n)$ and $W1(n)$ with correction error signal e'(n) represented by formula (14).

$$e'(n)=e(n)+r0(n) \cdot W0(n)+r1(n) \cdot W1(n) \tag{14}$$

$$W0(n+1)=W0(n)-\mu \cdot r0(n) \cdot e'(n) \tag{15}$$

$$W1(n+1)=W0(n)-\mu \cdot r1(n) \cdot e'(n) \tag{16}$$

The expectation values of the second terms on the right sides of formula (15) and formula (16) are represented by formula (17) and formula (18), respectively.

$$E[r0(n) \cdot e'(n)]=E[r0(n) \cdot e(n)]+E[r0(n) \cdot r0(n) \cdot W0(n)]+E[r0(n) \cdot r1(n) \cdot W1(n)] \tag{17}$$

$$E[r1(n) \cdot e'(n)]=E[r1(n) \cdot e(n)]+E[r1(n) \cdot r0(n) \cdot W0(n)]+E[r1(n) \cdot r1(n) \cdot W1(n)] \tag{18}$$

Since simulation signals $r0(n)$ and $r1(n)$ are a cosine wave and a sine wave each having an argument by a phase characteristic from loudspeaker 11 to residual sound detector 12, expectation value $E[r0(n) \cdot r1(n)]$ becomes zero.

Accordingly, formula (19) and formula (20) are obtained from formula (17) and formula (18), respectively.

$$E[r0(n) \cdot e'(n)]=E[r0(n) \cdot e(n)]+E[r0(n) \cdot r0(n) \cdot W0(n)] \tag{19}$$

$$E[r1(n) \cdot e'(n)]=E[r1(n) \cdot e(n)]+E[r1(n) \cdot r1(n) \cdot W1(n)] \tag{20}$$

The transfer characteristic from loudspeaker 11 to residual sound detector 12 includes a phase characteristic and gain C that is an amplitude characteristic. The phase characteristic is represented by function Φ(X) that shifts the argument of signal X. Using gain C and function Φ(X), simulation signals $r0(n)$ and $r1(n)$ are represented by formula (21) and formula (22), respectively.

$$r0(n)=C \cdot \Phi(b0(n)) \tag{21}$$

$$r1(n)=C \cdot \Phi(b1(n)) \tag{22}$$

Using formula (21) and formula (22), formula (19) and formula (20) are represented by formula (23) and formula (24), respectively.

$$E[r0(n) \cdot e'(n)]=E[r0(n) \cdot e(n)]+ \\ E[C^2 \cdot \Phi(b0(n)) \cdot \Phi(b0(n)) \cdot W0(n)] \tag{23}$$

$$E[r1(n) \cdot e'(n)]=E[r1(n) \cdot e(n)]+ \\ E[C^2 \cdot \Phi(b1(n)) \cdot \Phi(b1(n)) \cdot W1(n)] \tag{24}$$

Formula (25) and formula (26) also hold.

$$E[\Phi(b0(n)) \cdot \Phi(b0(n))]=E[b0(n) \cdot b0(n)] \tag{25}$$

$$E[\Phi(b1(n)) \cdot \Phi(b1(n))]=E[b1(n) \cdot b1(n)] \tag{26}$$

Accordingly, formula (27) and formula (28) are obtained from formula (23) and formula (24), respectively.

$$E[r0(n) \cdot e'(n)]=E[r0(n) \cdot e(n)]+ \\ C^2 \cdot E[\Phi(b0(n)) \cdot \Phi(b0(n)) \cdot W0(n)]=E[r0(n) \cdot e(n)]+ \\ C^2 \cdot E[b0(n) \cdot y(n)] \tag{27}$$

$$E[r1(n) \cdot e'(n)]=E[r1(n) \cdot e(n)]+C^2 \cdot E[b1(n) \cdot y(n)] \tag{28}$$

The instantaneous value of the gradient vector is used in the filter coefficient update equation, thereby providing formula (29) and formula (30).

$$W0(n+1)=W0(n)-\mu \cdot (r0(n) \cdot e(n)+C^2 \cdot b0(n) \cdot y(n)) \tag{29}$$

$$W1(n+1)=W1(n)-\mu \cdot (r1(n) \cdot e(n)+C^2 \cdot b1(n) \cdot y(n)) \tag{30}$$

In formula (29) and formula (30), the update vector is the instantaneous value of the value in which gain C of the amplitude characteristic is ignored as one, formula (7) and formula (8) can be derived.

Figure 3:
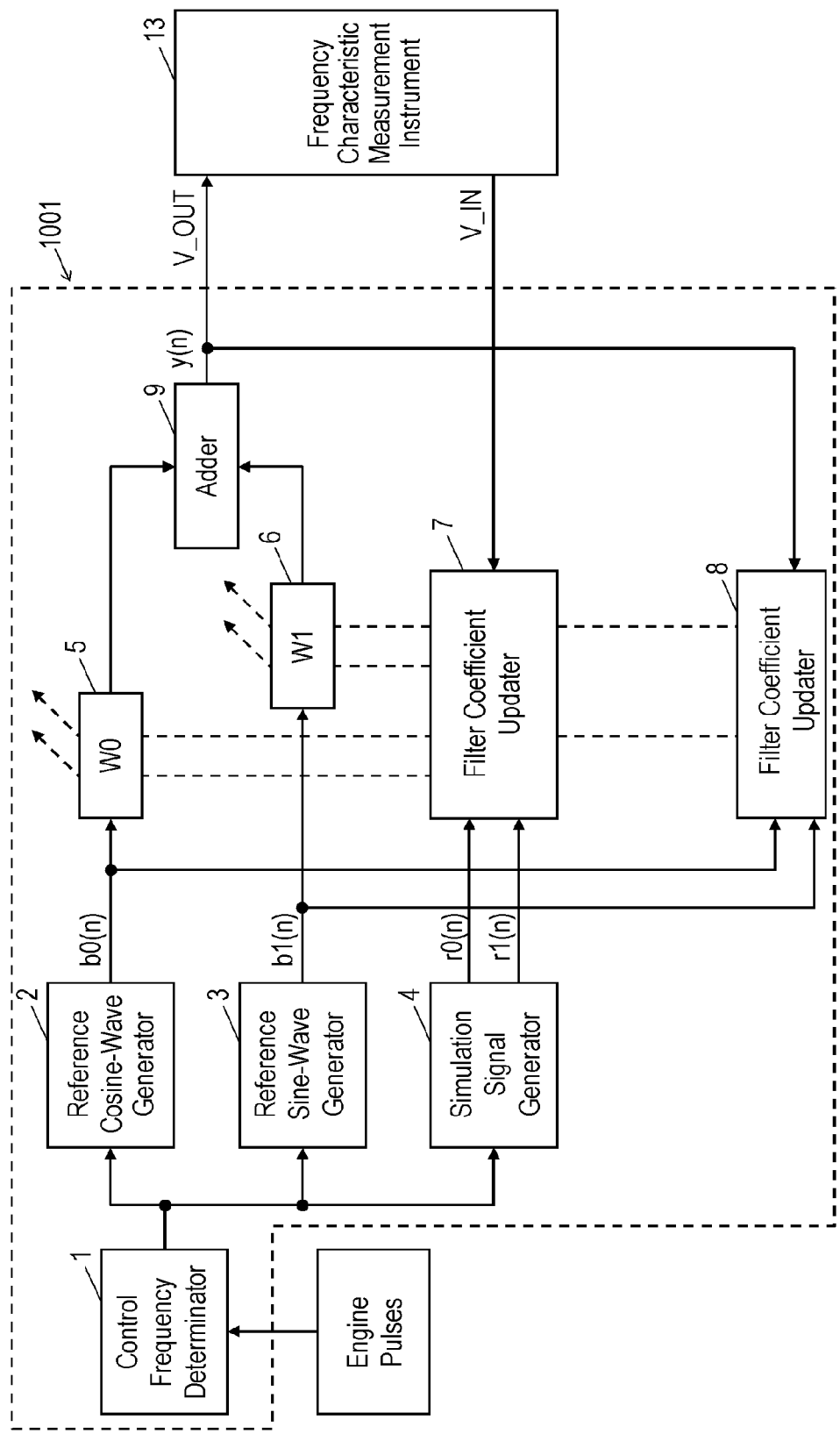
FIG. 3 is a block diagram of an open-loop frequency response measuring system of the active noise control device according to Embodiment 1.

Analysis of a characteristic of active noise control device 1001 will be described below. FIG. 3 is a block diagram of an open-loop frequency response measuring system of active noise control device 1001. FIG. 4 is a block diagram of an open-loop frequency response measuring system of conventional active noise control device 502 disclosed in PTL 2. In FIGS. 3 and 4, portions surrounded by broken lines indicate components constructed in active noise control devices 502 and 1001.

An open-loop frequency response of the adaptive filter is measured with active noise control devices 502 and 1001 and frequency response analyzer 13. Active noise control device 1001 according to Embodiment 1 is compared with conventional active noise control device 502 in a controlling performance.

The open-loop frequency response is measured by the following method. A pulse signal having a predetermined period corresponding to a target frequency (e.g., 100 Hz) determined by control frequency determinator 1 is applied as an engine pulse. Sine-wave input signal V_IN is applied to a terminal connected to residual sound detector 12. The ratio of output-terminal output V_OUT of loudspeaker 11 to sine-wave input signal V_IN is measured with frequency response analyzer 13, thereby measuring the open-loop frequency response.

The open-loop frequency response expresses a filter characteristic of adaptive notch filter 51 at frequency f determined by control frequency determinator 1. When the open-loop frequency responses of active noise control devices 502 and 1001 are coincide with each other, active noise control devices 502 and 1001 are identical to each other in the controlling performance at frequency f determined by control frequency determinator 1.

Figure 5A:
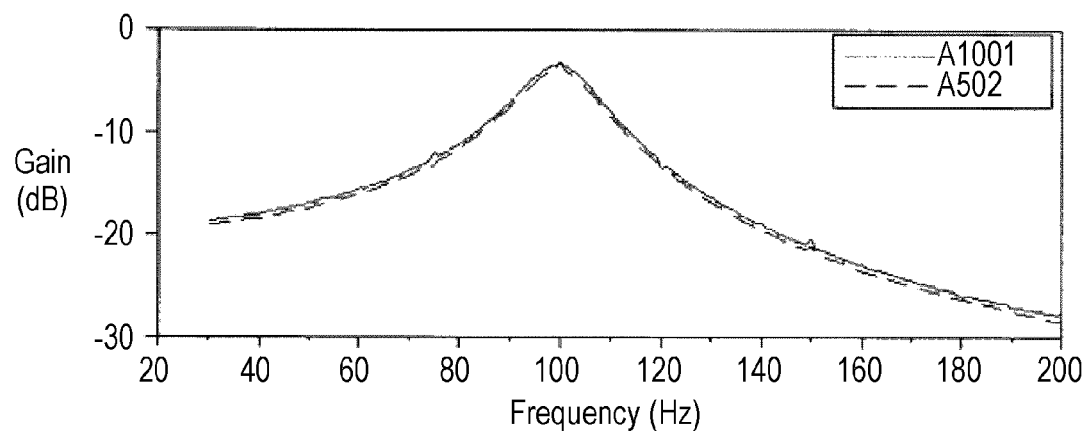
FIG. 5A is a characteristic diagram illustrating amplitude of an open loop when the active noise control device according to Embodiment 1 has a control frequency of 100 Hz.
Figure 5B:
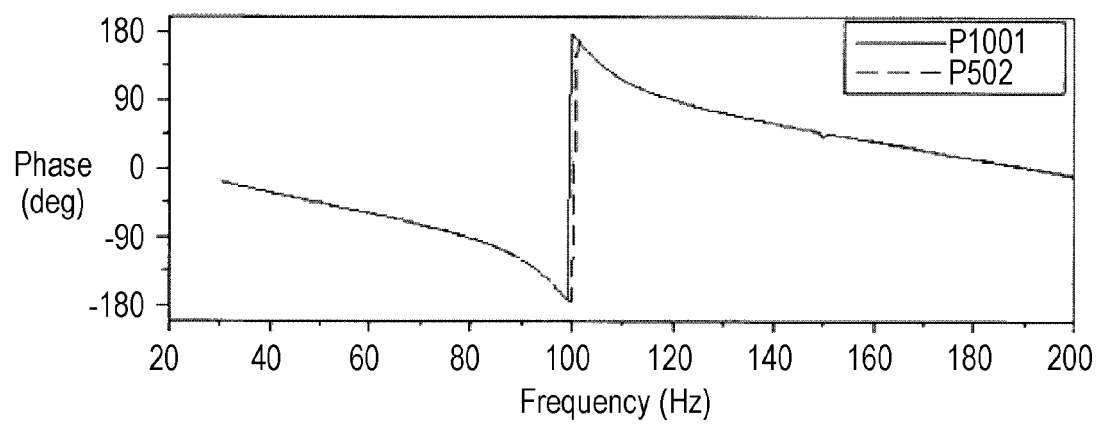
FIG. 5B is a characteristic diagram illustrating a phase of the open loop when the active noise control device according to Embodiment 1 has the control frequency of 100 Hz.
Figure 6A:
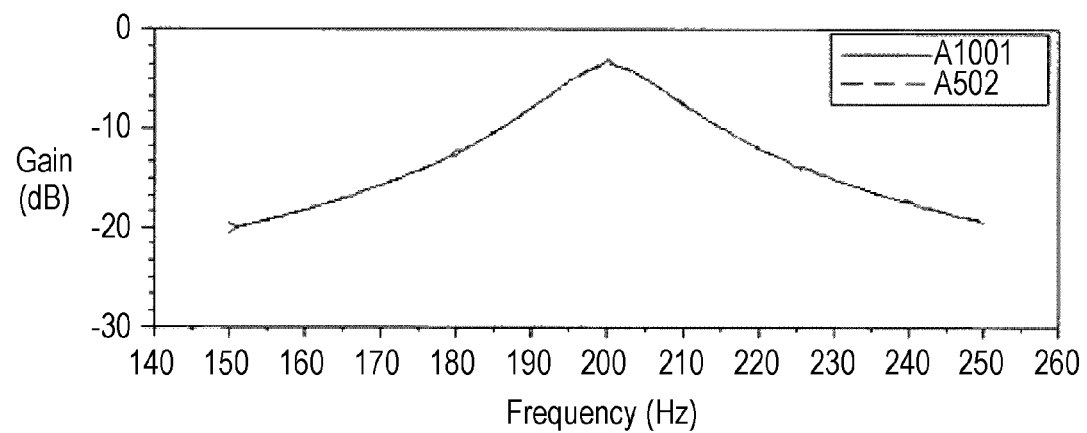
FIG. 6A is a characteristic diagram illustrating amplitude of the open loop when the active noise control device according to Embodiment 1 has the control frequency of 200 Hz.
Figure 6B:
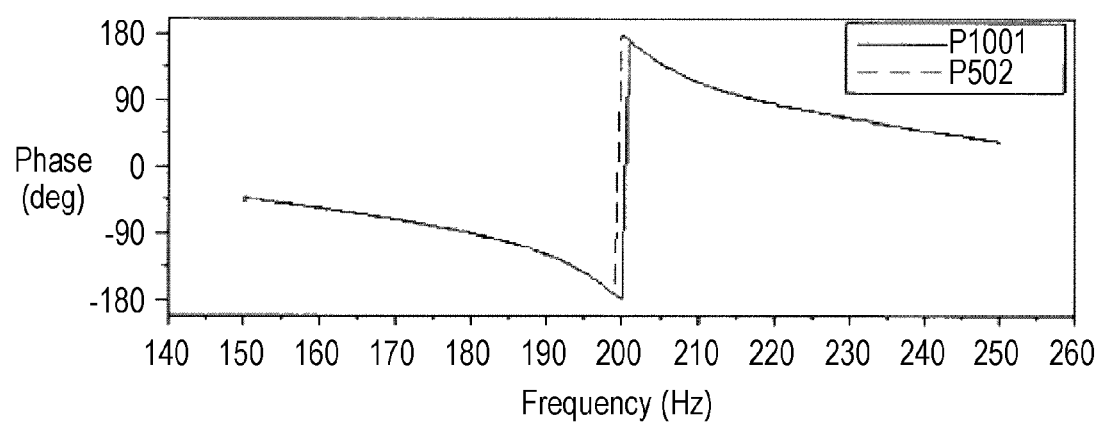
FIG. 6B is a characteristic diagram illustrating a phase of the open loop when the active noise control device according to Embodiment 1 has the control frequency of 200 Hz.

FIGS. 5A and 5B illustrate the open-loop frequency responses of active noise control devices 502 and 1001 for the control frequency of 100 Hz. FIG. 5A illustrates amplitude characteristic A502 of the open-loop frequency response of active noise control device 502 and amplitude characteristic A1001 of the open-loop frequency response of active noise control device 1001. FIG. 5B illustrates phase characteristic P502 of the open-loop frequency response of active noise control device 502 and phase characteristic P1001 of the open-loop frequency response of active noise control device 1001. FIGS. 6A and 6B illustrate the open-loop frequency responses of active noise control devices 502 and 1001 for the control frequency of 200 Hz. FIG. 6A illustrates the amplitude characteristic out of the open-loop frequency responses while FIG. 5B illustrates the phase characteristic out of the open-loop frequency responses.

In the phase characteristics shown in FIGS. 5B and 6B, the phase becomes 180 degrees near the control frequencies of 100 Hz and 200 Hz as expected. In the amplitude characteristics shown in FIGS. 5A and 6A, active noise control device 1001 according to Embodiment 1 is identical to conventional active noise control device 502 in the open-loop frequency response, and active noise control device 1001 according to Embodiment 1 has the same transfer characteristic as conventional active noise control device 502. That is, even when the current transfer characteristic changes considerably from the initial transfer characteristic, or even when the filter coefficients of one-tap adaptive filters 5 and 6 change largely due to mixture of an external noise, the adaptive control algorithm improves the stabilities of one-tap adaptive filters 5 and 6, and the overcompensation is suppressed at the position of an ear of the occupant' while the divergence of the filter coefficients is suppressed.

Exemplary Embodiment 2

Figure 7:
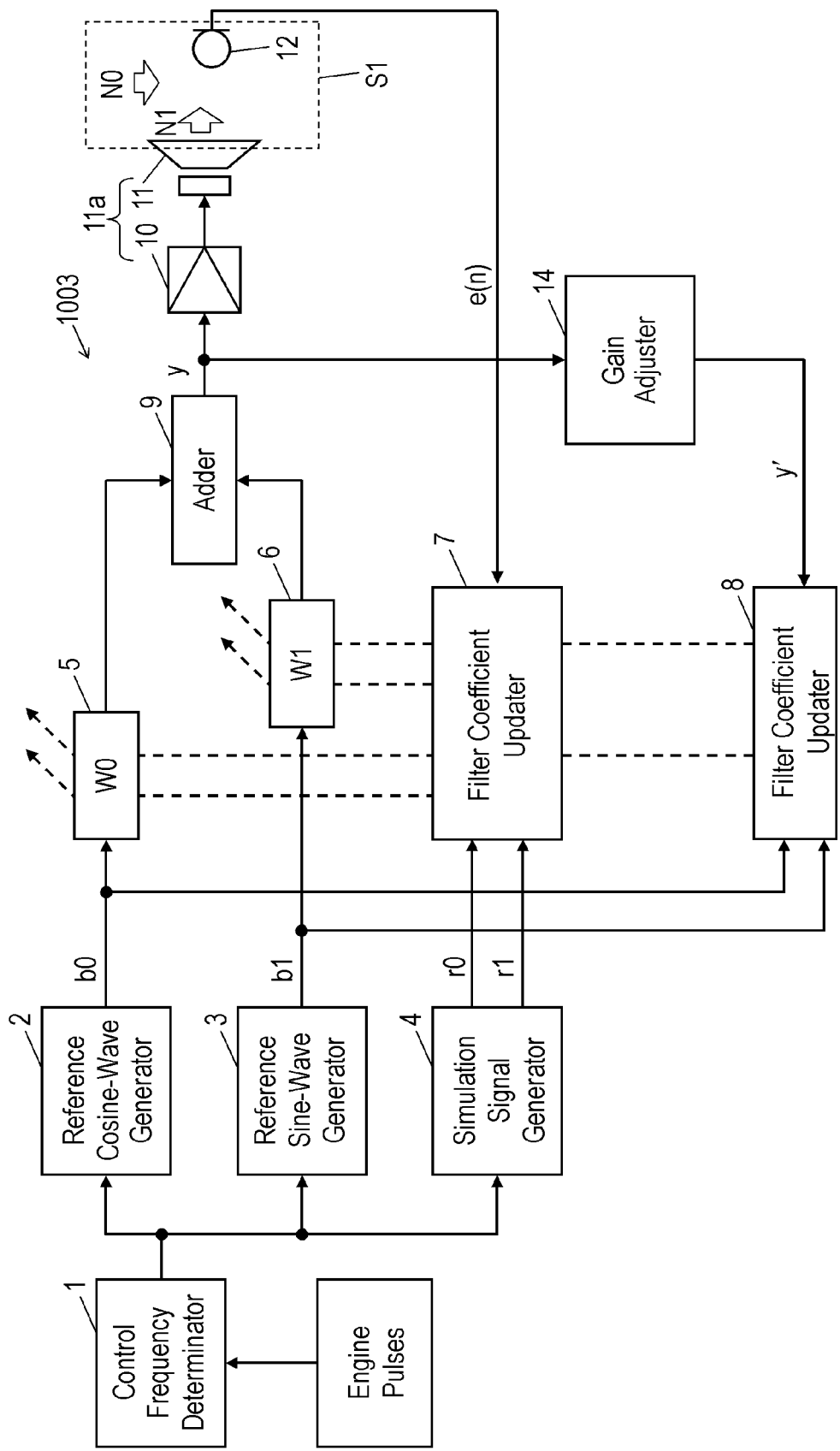
FIG. 7 is a block diagram of an active noise control device according to Exemplary Embodiment 2.

FIG. 7 is a block diagram of active noise control device 1003 according to Exemplary Embodiment 2. In FIG. 7, components identical to those of active noise control device 1001 according to Embodiment 1 shown in FIG. 1 are denoted by the same reference numerals.

Active noise control device 1003 further includes gain adjuster 14 provided between adder 9 and filter coefficient updater 8 of active noise control device 1001 according to Embodiment 1 shown in FIG. 1. In active noise control device 1003, filter coefficient updater 8 updates a filter coefficient using the output signal of gain adjuster 14.

Gain adjuster 14 multiplies output signal y(n) from adder 9 by gain coefficient α that is a predetermined constant, thereby obtaining output signal (α·y(n)). Filter coefficient updater 8 can adjust a convergence speed of the second adaptive control algorithm using reference cosine-wave signal b0(n) that is the output signal from reference cosine-wave generator 2, reference cosine-wave signal b1(n) that is the output signal from reference sine-wave generator 3, and the output signal from gain adjuster 14. Accordingly, the ideal noise reduction effect can more stably be obtained while the overcompensation is more optimally suppressed.

Gain adjuster 14 multiplies output signal y(n) of adder 9 by gain coefficient α. At this moment, filter coefficients W0(n) and W1(n) are updated by formula (31), formula (32), and formula (33).

$$W0(n+1)=W0(n)-\mu \cdot (r0(n)\cdot e(n)+b0(n)\cdot y'(n)) \quad (31)$$

$$W1(n+1)=W1(n)-\mu \cdot (r1(n)\cdot e(n)+b1(n)\cdot y'(n)) \quad (32)$$

$$y'(n)=\alpha \cdot y(n) \quad (33)$$

Gain coefficient α adjusts an update speed of the second adaptive control algorithm, and has the same effect as the gain coefficient for a compensation signal in conventional active noise control device 502. That is, the stability of the adaptive filter and a noise reduction amount during the convergence can be adjusted with gain coefficient α. As gain coefficient α increases, the stability of the adaptive filter is improved while the noise reduction amount decreases.

Figure 8A:
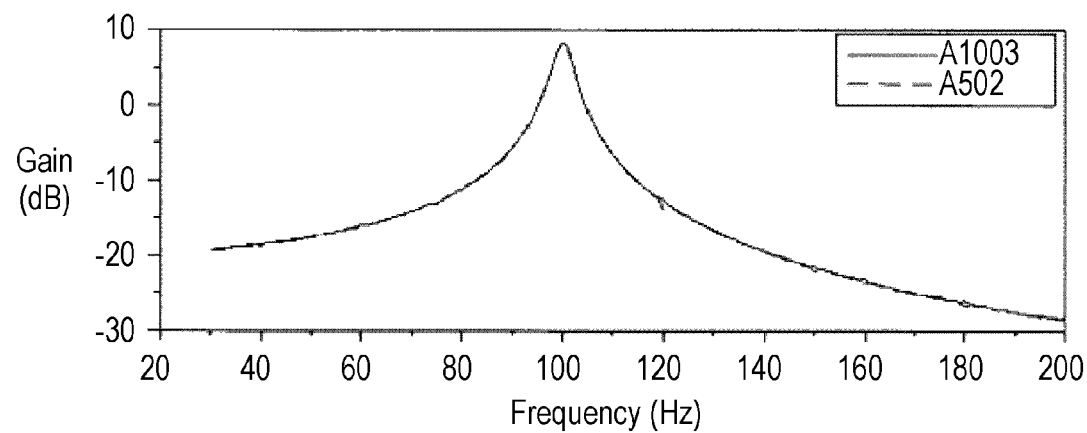
FIG. 8A is an open-loop frequency response diagram of the active noise control device according to Embodiment 2.
Figure 8B:
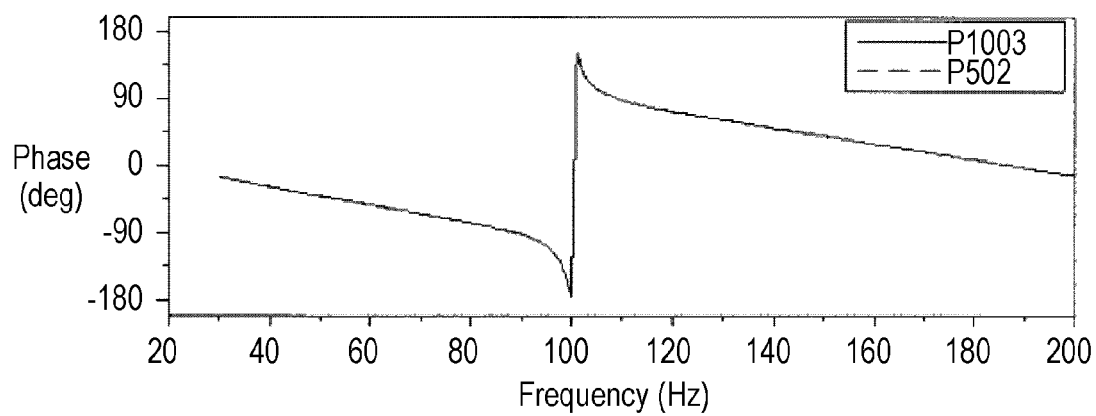
FIG. 8B is an open-loop frequency response diagram of the active noise control device according to Embodiment 2.

FIGS. 8A and 8B are open-loop frequency response diagrams of active noise control device 1003 when gain coefficient α under the condition of 0<α<1. FIG. 8A illustrates gain characteristic A1003 in open-loop frequency responses of active noise control device 1003 and gain characteristic A502 of conventional active noise control device 502. FIG. 8B illustrates phase characteristic P1003 in the open-loop frequency responses of active noise control device 1003 and phase characteristic P502 of conventional active noise control device 502.

Gain characteristic A1001 and phase characteristic P1001 shown in FIGS. 5A and 5B are identical to those for gain coefficient α is 1. As shown in FIGS. 5A and 8A and FIGS. 5B and 8B, the open-loop gains changes with respect to the frequency in active noise control device 1003 of the second exemplary embodiment and conventional active noise control device 502, and active noise control device 1003 is similar to conventional active noise control device 502 in the change of the open-loop gain. Accordingly, active noise control device 1003 according to Embodiment 2 has the same characteristic as conventional active noise control device 502. That is, in active noise control device 1003 according to Embodiment 2, when the current transfer characteristic changes considerably from the initial transfer characteristic, or when the filter coefficient of the adaptive filter changes largely due to the mixture of the external noise, the ideal noise reduction effect can be more stably obtained while the overcompensation is more optimally suppressed than active noise control device 1001 according to Embodiment 1.

In active noise control device 1003 according to Embodiment 2, gain coefficient α is a predetermined value. Alternatively, gain coefficient α may change according to frequency f of noise N0. In this case, gain coefficient α for each frequency f of noise N0 is previously stored in a recording medium as a table. Gain coefficient α can be fixed by referring to a value of gain coefficient α from the table based on frequency f output from control frequency determinator 1.

Gain adjuster 14 can adjust a correction signal level according to the acoustic transfer characteristic in the vehicle compartment by multiplying output signal y(n) of adder 9 by gain coefficient α corresponding to frequency f of noise N0 to be controlled which is determined by control frequency determinator 1. Therefore, the ideal noise reduction effect can more stably be obtained while the overcompensation is more optimally suppressed.

While active noise control device 1003 is actually installed to the vehicle, the transfer characteristic from loudspeaker 11 to residual sound detector 12 that is the microphone has the frequency characteristic in which both the amplitude and the phase depend on frequency f. When the amplitude has a dip (notch), or when the phase changes largely, a possibility of diverging of one-tap adaptive filters 5 and 6 changes largely according to frequency f. Gain coefficient α is properly determined in each of frequencies f, thereby stably providing ideal noise reduction effect.

In accordance with Embodiment 2, gain coefficient α may be changed according to a sum of squares of filter coefficients W0(n) and W1(n) of one-tap adaptive filters 5 and 6 represented by formula (34).

$$W0(n)^2+W1(n)^2 \quad (34)$$

That is, output signal y(n) of adder 9 may be multiplied by gain coefficient α having a value depending on the sum of squares of filter coefficients W0(n) and W1(n) of one-tap adaptive filters 5 and 6.

That is, each of values of gain coefficient α corresponding to respective one of values of the sum of squares of filter coefficients W0(n) and W1(n) is previously stored in the recording medium as a table. At the calculation, the sum (W0(n)²+W1(n)²) of squares of filter coefficients W0(n) and W1(n) is calculated, a value of gain coefficient α is read from the table based on the sum, and then, filter coefficients W0(n+1) and W1(n+1) are obtained based on the adaptive control algorithm.

Therefore, since the update speeds of filter coefficients W0(n) and W1(n) are adjusted according to a possibility of a divergence phenomenon that filter coefficients W0(n) and W1(n) increase excessively, the divergence is suppressed while sacrifice of the noise reduction effect is suppressed, thus providing the more ideal noise reduction effect.

In this case, for the large sum of the squares, namely, for the high divergence possibilities of one-tap adaptive filters 5 and 6, gain coefficient α increases to suppress update speed of filter coefficients W0(n) and W1(n), thereby decreasing of the divergence possibility. On the other hand, for the small sum of the squares, namely, for the low divergence possibilities of one-tap adaptive filters 5 and 6, since gain coefficient α decreases not to suppress the update speed of filter coefficients W0(n) and W1(n), the noise reduction effect can maximally be obtained. Therefore, the divergence of one-tap adaptive filters 5 and 6 is suppressed while the decrease of the noise reduction effect is suppressed, and the more ideal noise reduction effect can be obtained.

Active noise control devices 1001 to 1003 according to Embodiments 1 and 2 reduce the cost thereof without increasing the computation amount even if including plural residual sound detectors. In active noise control devices 1001 to 1003, even when the current transfer characteristic changes considerably from the initial transfer characteristic, or even when filter coefficients W0(n) and W1(n) of one-tap adaptive filters 5 and 6 change largely due to the mixture of the external noise, the adaptive control algorithm improves its stability, and the overcompensation is suppressed at the position of an ear of the occupant while the divergence of one-tap adaptive filters 5 and 6 is suppressed, thus providing an ideal noise reduction effect.

INDUSTRIAL APPLICABILITY

An active noise control device according to the present invention can be applied in an apparatus, such as an automobile, requiring an accurate noise reduction effect.

REFERENCE MARKS IN THE DRAWINGS

1 control frequency determinator
2 reference cosine-wave generator
3 reference sine-wave generator
4 simulation signal generator
5 one-tap adaptive filter (first one-tap adaptive filter)
6 one-tap adaptive filter (second one-tap adaptive filter)
7 filter coefficient updater (first filter coefficient updater)
8 filter coefficient updater (second filter coefficient updater)
9 adder
10 power amplifier
11 loudspeaker
11a secondary noise generator
12, 15 residual sound detector
13 frequency response analyzer
14 gain adjuster
52 filter coefficient updating unit
N0 noise
N1 secondary noise
S1 control space

The invention claimed is:
1. An active noise control device configured to reduce a noise, the active noise control device comprising:

a control frequency determinator that determines a frequency of the noise;
a reference cosine-wave generator that generates a reference cosine-wave signal having the determined frequency;
a reference sine-wave generator that generates a reference sine-wave signal having the determined frequency;
a first one-tap adaptive filter that receives the reference cosine-wave signal, the first one-tap adaptive filter having a first filter coefficient;
a second one-tap adaptive filter that receives the reference sine-wave signal, the second one-tap adaptive filter having a second filter coefficient;
an adder that adds an output signal from the first one-tap adaptive filter to an output signal from the second one-tap adaptive filter;
a secondary noise generator that is driven by an output signal from the adder as to generate a secondary noise;
a residual sound detector that detects a residual sound generated by interference between the secondary noise and the noise;
a simulation signal generator that outputs a simulation cosine-wave signal and a simulation sine-wave signal obtained by correcting the reference cosine-wave signal and the reference sine-wave signal with a characteristic simulating a transfer characteristic stored in advance from the secondary noise generator to the residual sound detector; and
a filter coefficient updating unit that updates the first filter coefficient and the second filter coefficient based on an output signal from the residual sound detector, an output signal from the simulation signal generator, the reference cosine-wave signal, the reference sine-wave signal, and the output signal from the adder,
wherein the filter coefficient updating unit includes:
a first filter coefficient updater that updates the first filter coefficient and the second filter coefficient using, directly, the output signal from the residual sound detector and the output signal from the simulation signal generator; and
a second filter coefficient updater that updates the first filter coefficient and the second filter coefficient using, directly, the reference cosine-wave signal, the reference sine-wave signal, and the output signal from the adder.

2. The active noise control device according to claim 1, further comprising a gain adjuster, wherein the gain adjuster is provided between the adder and the second filter coefficient updater.

3. The active noise control device according to claim 2, wherein the second filter coefficient updater updates the second filter coefficient with an output signal of the gain adjuster.

4. The active noise control device according to claim 2, wherein a predetermined gain coefficient is decided according to the determined frequency.

5. The active noise control device according to claim 1,
wherein the first filter coefficient updater updates the first filter coefficient and the second filter coefficient based on the output signal from the residual sound detector and the output signal from the simulation signal generator with use of none of the reference cosine-wave signal, the reference sine-wave signal, and the output signal from the adder, and
wherein the second filter coefficient updater updates the first filter coefficient and the second filter coefficient based on the reference cosine-wave signal, the reference sine-wave signal, and the output signal from the adder with use of none of the output signal from the residual sound detector and the output signal from the simulation signal generator.

6. The active noise control device according to claim 1, wherein the filter coefficient updating unit updates the first filter coefficient using a following formula:

$$W0(n+1)=W0(n)-\mu \cdot (r0(n) \cdot e(n)+b0(n) \cdot y(n)),$$

wherein the filter coefficient updating unit updates the second filter coefficient using a following formula:

$$W1(n+1)=W1(n)-\mu \cdot (r1(n) \cdot e(n)+b1(n) \cdot y(n)), \text{ and}$$

wherein
- $W0(n)$ is the first filter coefficient,
- $W1(n)$ is the second filter coefficient,
- $W0(n+1)$ is an updated first filter coefficient,
- $W1(n+1)$ is an updated second filter coefficient,
- $\mu$ is a step size parameter,
- $r0(n)$ is the simulation cosine-wave signal,
- $r1(n)$ is the simulation sine-wave signal,
- e(n) is the output signal from the residual sound detector,
- $b0(n)$ is the reference cosine-wave signal,
- $b1(n)$ is the reference sine-wave signal, and
- y(n) is the output signal from the adder.

7. The active noise control device according to claim 1, further comprising a gain adjuster configured to multiply the output signal from the adder by a gain coefficient to provide a modified output of the adder using a following formula:

$$y'(n)=\alpha \cdot y(n),$$

wherein the filter coefficient updating unit updates the first filter coefficient using a following formula:

$$W0(n+1)=W0(n)-\mu \cdot (r0(n) \cdot e(n)+b0(n) \cdot y'(n)),$$

wherein the filter coefficient updating unit updates the second filter coefficient using a following formula:

$$W1(n+1)=W1(n)-\mu \cdot (r1(n) \cdot e(n)+b1(n) \cdot y'(n)), \text{ and}$$

wherein
- $W0(n)$ is the first filter coefficient,
- $W1(n)$ is the second filter coefficient,
- $W0(n+1)$ is an updated first filter coefficient,
- $W1(n+1)$ is an updated second filter coefficient,
- $\mu$ is a step size parameter,
- $r0(n)$ is the simulation cosine-wave signal,
- $r1(n)$ is the simulation sine-wave signal,
- e(n) is the output signal from the residual sound detector,
- $b0(n)$ is the reference cosine-wave signal,
- $b1(n)$ is the reference sine-wave signal,
- $\alpha$ is the gain coefficient,
- y(n) is the output signal from the adder, and
- y'(n) is the modified output of the adder.

8. The active noise control device according to claim 1, wherein the second filter coefficient updater directly receives the reference cosine-wave signal, the reference sine-wave signal, and the output signal from the adder for updating the first filter coefficient and the second filter coefficient.

* * * * *